United States Patent
Canonge et al.

(10) Patent No.: US 9,470,025 B2
(45) Date of Patent: Oct. 18, 2016

(54) SNAP FEATURE PROVIDING COMPONENT ATTACHMENT

(75) Inventors: Eric Canonge, Charlotte, NC (US); John Southwell, Cornelius, NC (US)

(73) Assignee: HUSQVARNA AB, Huskvama (SE)

( * ) Notice: Subject to any disclaimer, the term of this patent is extended or adjusted under 35 U.S.C. 154(b) by 0 days.

(21) Appl. No.: 14/234,273

(22) PCT Filed: Jul. 27, 2011

(86) PCT No.: PCT/US2011/045542
§ 371 (c)(1),
(2), (4) Date: Jan. 22, 2014

(87) PCT Pub. No.: WO2013/015804
PCT Pub. Date: Jan. 31, 2013

(65) Prior Publication Data
US 2014/0159382 A1    Jun. 12, 2014

(51) Int. Cl.
*E05C 19/06* (2006.01)
*F16B 21/07* (2006.01)
(Continued)

(52) U.S. Cl.
CPC ............ *E05C 19/066* (2013.01); *E05C 19/06* (2013.01); *F16B 5/0664* (2013.01); *F16B 21/073* (2013.01); *F16B 21/088* (2013.01); *Y10S 24/51* (2013.01); *Y10T 292/0902* (2015.04)

(58) Field of Classification Search
CPC .... E05C 19/06; E05C 19/066; F16B 21/073; F16B 5/0664; F16B 21/08; F16B 21/088; Y10T 292/0902; Y10S 24/51
USPC ........... 292/1, 80, 81, 84, 87, 288, 289, 292, 292/300, 342, 343, DIG. 38; 24/297, 457, 24/458, DIG. 51
See application file for complete search history.

(56) References Cited

U.S. PATENT DOCUMENTS 2,135,417 A * 11/1938 Tinnerman ...................... 72/326
2,326,579 A * 8/1943 Tinnerman .............. F16B 21/20
315/DIG. 2
(Continued)

FOREIGN PATENT DOCUMENTS

CN     200955537 Y    10/2007
CN     101440837 Y     5/2009
(Continued)

OTHER PUBLICATIONS

International Search Report and Written Opinion of PCT/US2011/045542 mailed Dec. 9, 2011, all enclosed pages cited.
(Continued)

Primary Examiner — Kristina Fulton
Assistant Examiner — Christine M Mills
(74) Attorney, Agent, or Firm — Nelson Mullins Riley & Scarborough LLP

(57) ABSTRACT

A snap assembly may include a cantilever snap and a retention body. The cantilever snap may include an orifice in a surface of a first component. The orifice may be defined between sidewalls. The cantilever snap may further comprise a cantilevered-slant protrusion extending between the sidewalls and out of the orifice at an angle relative to the surface. The retention body may be attached to a second component and configured to be inserted into the orifice from a side of the first component that is opposite of a side of the first component away from which the cantilevered-slant protrusion extends to secure the retention body to the cantilever snap. The retention body may include a retaining extension comprising a holding assembly. The holding assembly may comprise a plurality of teeth that are arrayed to form a series of step-like protrusions that step away from a contact face of the retention body.

20 Claims, 3 Drawing Sheets

Figure 1:
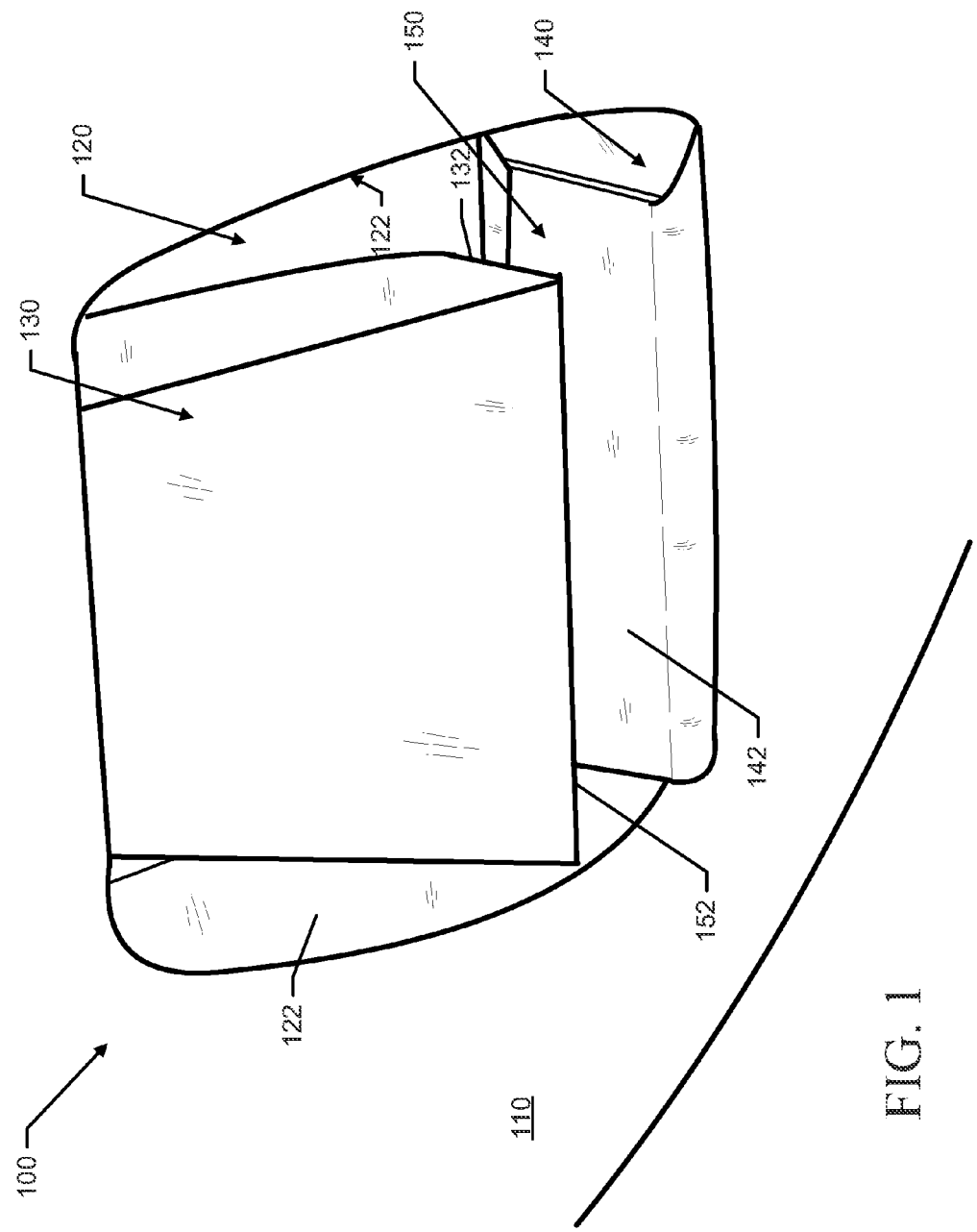

(51) Int. Cl.
*F16B 5/06* (2006.01)
*F16B 21/08* (2006.01)

(56) References Cited

U.S. PATENT DOCUMENTS

| | | | |
|---|---|---|---|
| 2,548,838 A * | 4/1951 | Gillespie | 24/453 |
| 3,947,932 A | 4/1976 | Flynn | |
| 4,004,734 A * | 1/1977 | Hadtke | 239/58 |
| 4,408,914 A * | 10/1983 | Ciesiel et al. | 400/208 |
| 4,636,915 A * | 1/1987 | Perkins et al. | 361/637 |
| 4,844,645 A | 7/1989 | Rasmussen | |
| 5,577,779 A * | 11/1996 | Dangel | 292/80 |
| 5,669,731 A * | 9/1997 | Hironaka et al. | 403/397 |
| 5,937,867 A | 8/1999 | Williams | |
| 6,220,637 B1 | 4/2001 | Kierl | |
| 6,433,559 B1 | 8/2002 | Lahoreau et al. | |
| 6,471,313 B1 | 10/2002 | Ueda et al. | |
| 7,360,964 B2 * | 4/2008 | Tsuya et al. | 403/280 |
| 7,950,186 B2 | 5/2011 | Gross et al. | |
| 2003/0143053 A1 * | 7/2003 | Kanie | 411/45 |
| 2005/0054229 A1 | 3/2005 | Tsuya et al. | |
| 2008/0313868 A1 * | 12/2008 | Kamiya et al. | 24/453 |
| 2009/0087279 A1 * | 4/2009 | McGinn et al. | 411/337 |

FOREIGN PATENT DOCUMENTS

| | | |
|---|---|---|
| DE | 1575071 A1 | 11/1969 |
| DE | 20204674 U1 | 8/2003 |
| EP | 0736694 A1 | 10/1996 |
| JP | 2002067974 A | 3/2002 |

OTHER PUBLICATIONS

Chapter I International Preliminary Report on Patentability of PCT/US2011/045542 mailed Jan. 28, 2014, all enclosed pages cited.

* cited by examiner

SNAP FEATURE PROVIDING COMPONENT ATTACHMENT

TECHNICAL FIELD

Example embodiments generally relate to mechanisms for joining components and, more particularly, relate to a snap feature that may be utilized to join two components securely with a relatively low insertion force.

BACKGROUND

During assembly of many products, particularly those that employ plastic components, it is necessary to secure adjacent parts to each other. As an example, during assembly of outdoor power equipment such as a riding lawn mower, there may be a number of body panels that may need to be secured to each other, the frame and/or other components.

Joining of components may typically be performed using hardware (e.g., metal clasps, snaps or buckles that join adjacent plastic pieces) or plastic snaps. Although hardware can often provide secure joints and may be relatively easy to employ, the use of hardware increases the number of components since the hardware is actually separate from the plastic components being joined and must be separately produced and then may also take more effort in assembly. Plastic snaps, which may employ a conventional cantilever snap design, may require varying amounts of force to install since it is typical for the amount of install force of a plastic snap to increase with the stiffness of the material and the desired amount of engagement. As such, where a great deal of holding power is desired, a plastic snap that requires a lot of force and is difficult to install must typically be used. Moreover, in many cases, the snap may require a corresponding hole or attachment feature that is large enough for the widest portion of the snap to fit through. Thus, the snap head can fit back through the hole and the two components may come apart.

Furthermore, some snap designs require that the snap, hole, and components be manufactured with very small tolerances in order for the snap to hold the components together tightly. Sometimes deviations from these small tolerances can cause the snap to loosely fit in the hole (resulting in a loose fitting between the two components) or may prevent the snap from locking in the hole at all (preventing the joining of the two components at that snap location). Given some of the issues described above, it may be desirable to provide a snap feature that is capable of addressing at least some of these situations.

BRIEF SUMMARY OF SOME EXAMPLES

Some example embodiments may provide a snap feature providing component attachment with a relatively low insertion force, but without a correspondingly low pullout force. In this regard, in some cases, a snap feature of an example embodiment may actually provide an extremely high pullout force. Accordingly, a snap feature according to an example embodiment may be used to join plastic components of outdoor power equipment such as a riding lawn care vehicle or other manufactured goods.

In one example embodiment, a snap assembly is provided. The snap assembly may include a cantilever snap and a retention body. The cantilever snap may include an orifice defined in a surface of a first component. The orifice may be defined between sidewalls. The cantilever snap may further comprise a cantilevered-slant protrusion extending between the sidewalls and out of the orifice at an angle relative to the surface. The retention body may be attached to a second component and may be configured to be inserted into the orifice from a side of the first component that is opposite of a side of the first component away from which the cantilevered-slant protrusion extends to secure the retention body to the cantilever snap. The retention body may include a retaining extension comprising a holding assembly that lies in a plane that lies at an angle to a plane in which the retention body lies.

In some embodiments, the holding assembly comprises a plurality of teeth that are arrayed to form a series of step-like protrusions that sequentially step away from a contact face of the retention body. Each step-like protrusion is configured to engage with the cantilevered-slant protrusion to hold the retention body within the orifice. In this regard, each of the series of step-like protrusions defines a discrete holding point at which the retention body may be held, each discrete holding point being a corresponding different distance from a distal end of the retention body.

Some example embodiments may improve the ability of manufacturers to facilitate easy, but secure assembly of manufactured goods having plastic components.

BRIEF DESCRIPTION OF THE SEVERAL VIEWS OF THE DRAWING(S)

Figure 2:
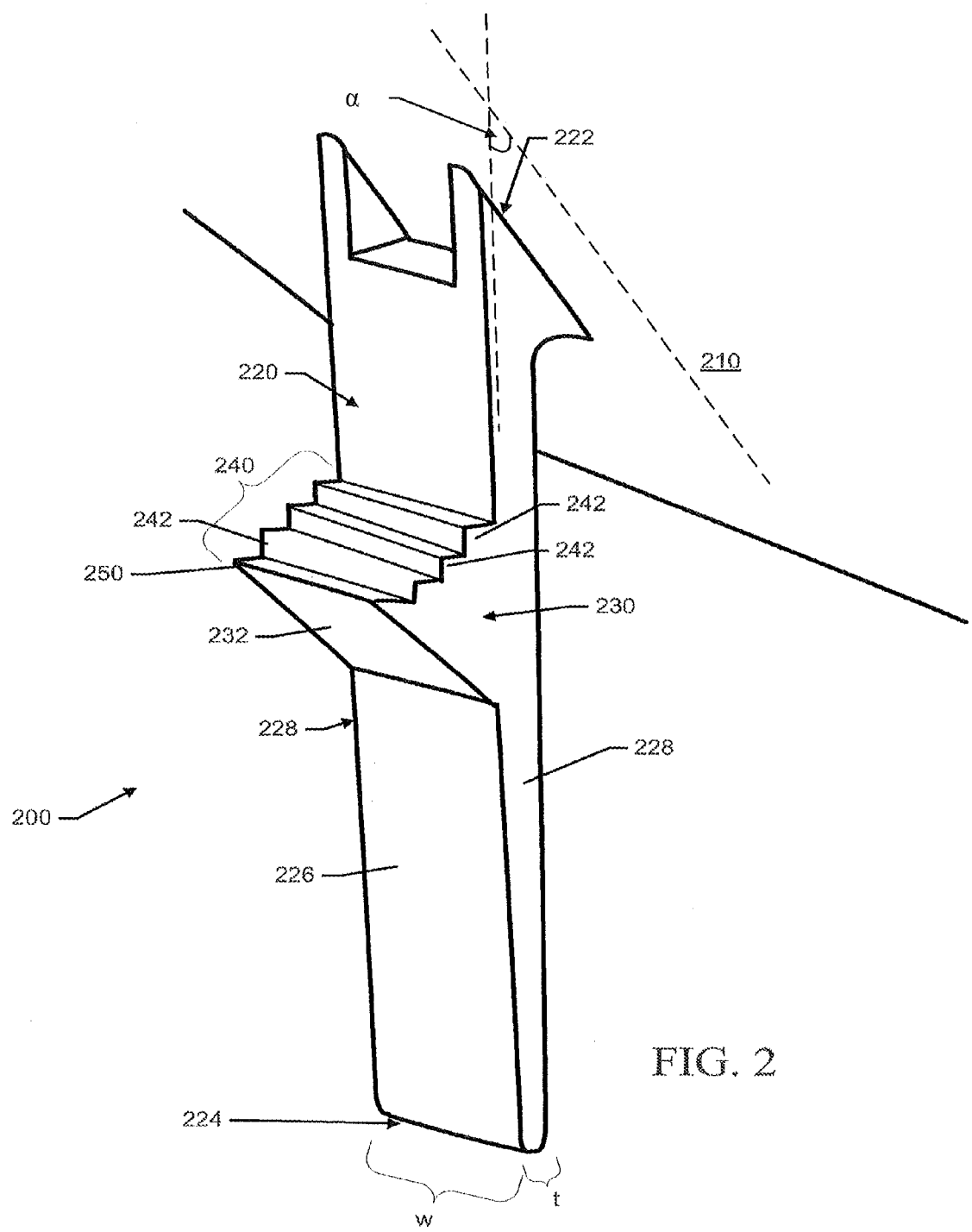
Figure 3:
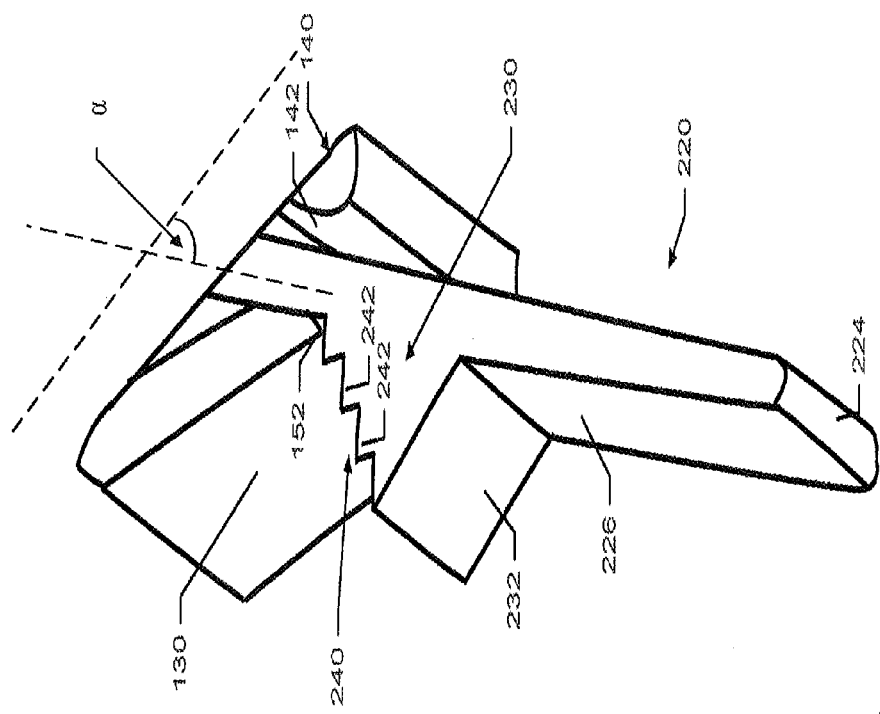

Having thus described the invention in general terms, reference will now be made to the accompanying drawings, which are not necessarily drawn to scale, and wherein:

FIG. 1 illustrates a perspective view of a cantilever snap on a first component according to an example embodiment;

FIG. 2 illustrates a perspective view of a second component having a retention device thereon that is capable of engagement with the cantilever snap to secure the first component to the second component according to an example embodiment; and FIG. 3 illustrates a perspective view of the first component and the second component joined together via engagement of the cantilever snap to the retention device according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

An example embodiment will now be described in reference to FIGS. 1-3. In this regard, FIG. 1 illustrates a perspective view of a cantilever snap on a first component according to an example embodiment. FIG. 2 illustrates a perspective view of a second component having a retention device thereon that is capable of engagement with the cantilever snap to secure the first component to the second component according to an example embodiment. FIG. 3 illustrates a perspective view of the first component and the second component joined together via engagement of the cantilever snap to the retention device according to an example embodiment.

Referring first to FIG. 1, a cantilever snap 100 is shown disposed at a first component 110. In an example embodiment, the first component 110 and the cantilever snap 100 may each be formed of the same material (e.g., plastic). Moreover, in some cases, the cantilever snap 100 may be tooled or machined in the first component 110 such that the cantilever snap 100 and the first component 110 are integrally formed in the same unitary piece of material.

The first component 110 may be provided and a surface of the first component 110 is generally visible in FIG. 1. The first component 110 may include an orifice 120 that passes entirely through the surface of the first component 110. Two sidewalls 122 may be formed in the first component to define sides of the orifice 120 (portions of only one of the sidewalls 122 are clearly shown in FIG. 1). In an example embodiment, a cantilevered-slant protrusion 130 may extend from the first component 110 through a portion of the orifice 120 and also extend over a substantial portion of the orifice 120. In this regard, for example, a width of the cantilevered-slant protrusion 130 may extend substantially between the sidewalls 122 and a length of the cantilevered-slant protrusion 130 may extend away from the surface of the first component 110 to cover a substantial portion of the orifice 120. As such, the cantilevered-slant protrusion 130 may extend to form an angle (e.g., an acute angle) with the surface of the first component 110. In some embodiments, the angle may be between about 35 degrees and about 75 degrees).

In an example embodiment, the cantilevered-slant protrusion 130 may include an engagement face 132 disposed at a distal end thereof. The engagement face 132 may be disposed to substantially face toward an alignment rib 140 that may be disposed to extend between the sidewalls 122 at a portion of the orifice 120 that is disposed opposite the portion of the orifice 120 from which the cantilevered-slant protrusion 130 extends. The alignment rib 140 may extend from the same surface of the first component 110 from which the cantilevered-slant protrusion 130 extends. Moreover, the alignment rib 140 may define an engagement surface 142 that extends substantially between the sidewalls and also extends substantially parallel to the direction of extension of the engagement face 132 of the cantilevered-slant protrusion 130. In some embodiments, the engagement face 132 and the engagement surface 142 may be disposed to face each other and may each lie substantially within respective planes that lie substantially parallel to each other to define a reception area 150 capable of receiving a retention device as described in greater detail below. In some cases, a distal end of the cantilevered-slant protrusion 130 (e.g., proximate to the engagement face 132) may form a relatively sharp edge 152.

FIG. 2 illustrates a retention device 200 of an example embodiment. The retention device 200 may be adjoined to a second component 210, at an angle α. In an example embodiment, the second component 210 and the retention device 200 may each be formed of the same material (e.g., plastic). Moreover, in some cases, the retention device 200 may be tooled, machined or molded in the second component 210 such that the retention device 200 and the second component 210 are integrally formed in the same unitary piece of material.

The retention device 200 may extend away from a surface of the second component 210 to form a tongue or retention body 220. In an example embodiment, a length of the retention body 220 may be measured from a proximal end 222 that contacts the surface of the second component 210 to a distal end 224 that is farthest from the surface of the second component 210. The width (w) of the retention body 220 may be defined substantially as the width of a contact face 226 of the retention body 220 that extends along the length of the retention body 220 between lateral edges 228 of the retention body 220. In an example embodiment, the width (w) of the retention body 220 may remain constant over an entirety of the length of the retention body 220. A thickness (t) of the retention body 220 may be defined as a distance between the contact face 226 and a back face (not shown in FIG. 2) of the retention body 220. In other words, the thickness (t) of the retention body 220 may be defined by the width of the lateral edges 228. In some embodiments, the thickness (t) may decrease as the retention body 220 extends from the proximal end 222 to the distal end 224 thereof. However, in alternative embodiments, the thickness (t) may remain constant over the length of the retention body 220. Moreover, in some embodiments, the width (w) may vary along with the thickness (t).

In an example embodiment, the retention body 220 may include a retaining extension 230. The retaining extension 230 may be disposed at a portion of the contact face 226 that is spaced apart from the surface of the second component 210. In some embodiments, the distance by which the retaining extension 230 and the surface of the second component 210 are separated may be determined at least in part based on a thickness of the first component 110 and/or a degree of tightness that is desired for connecting the first and second components 110 and 210 together by insertion of the retention device 200 into the cantilever snap 100. When the retention device 200 is inserted into the orifice 120 of the cantilever snap 100 past the retaining extension 230, the retaining extension 230 may extend past the edge 152 such that a portion of the retention body 220 that is between the proximal end 222 and the retaining extension may be held in the reception area 150. The retaining extension 230 may hold the retention body 220 in place relative to the cantilever snap 100 such that the first component 110 is held in relative close proximity and also relatively tightly to the second component 210.

In some embodiments, the retaining extension 230 may include a lead-in 232 and a holding assembly 240. The lead-in 232 may be a face that lies in a plane forming an angle with the contact face 226. In an example embodiment, the distal end 222 of the retention body 220 may be inserted into the orifice from a direction opposite of the direction at which the cantilevered-slant protrusion 130 and the alignment rib 140 extend away from the surface of the first component 110. As such, as the distal end 222 is inserted into the reception area 150 and then the retention body 220 is advanced through the reception area 150 until the edge 152 reaches the lead-in 232, the retention body 220 may move relatively freely as the distance between the edge 152 and the alignment rib 140 may be slightly larger than the thickness (t) of the retention body 220. The lead in 232 may gradually increase the apparent thickness of the retention body 220 in the region of the retaining extension 230 and the cantilevered-slant protrusion 130 may begin to be forced away from the alignment rib 140 as the retaining extension 230 is moved through the reception area 150. In this regard, for example, a thickness of the retention body 200 may, in some cases, be increased linearly over a length of the lead-in 232. Because the lead-in 232 is slanted smoothly, the edge 152 may slide over the lead-in 232 and continue to extend a distance between the engagement face 132 and the engagement surface 142 as the thickness of the retention body 220 increases to a point of maximum thickness 250. After the point of maximum thickness 250, the holding assembly 240 may engage the edge 152 to prevent movement of the retention body 220 back in the direction of insertion. Thus, the point of maximum thickness 250 may separate the holding assembly 240 and the lead-in 232.

In an example embodiment, the holding assembly 240 may include teeth 242 configured to engage the edge 152 after the edge 152 passes over each respective one of the teeth 242 in order to prevent movement of the retention body 220 back in the direction of insertion. The teeth 242 may be arranged as a series of step-like protrusions and alternating valleys disposed on an incline relative to the contact face 226. As such, the plane in which the teeth 242 lie (and therefore the plane along which the holding assembly 240 is arrayed) may be disposed at an angle relative to a plane of the retention body 220 (or the plane of the contact face 226). Although not required, in some embodiments, the teeth 242 may be arranged as a series of steps (as shown in FIGS. 2 and 3) in which each step corresponds to one of the teeth 242 and each step includes one portion that provides a face that lies in a plane that is substantially perpendicular to the plane in which the contact face 226 lies, and another face that lies in a plane that is substantially parallel to the plane in which the contact face 226 lies. Thus, as the retention body 220 is pulled through the reception area 150 such that the cantilevered-slant protrusion 130 is deflected to allow passage of the lead in 232 through the reception area 150 until the edge 152 reaches the holding assembly 240, the edge 152 may be enabled to pass over each sequential one of the steps that form the teeth 242. The edge 152 may simply slide past each face that lies in a plane that is substantially parallel to the plane in which the contact face 226 lies, and the face that lies in a plane that is substantially perpendicular to the plane in which the contact face 226 lies may prevent movement of the retention body 220 back in the direction of insertion.

Of note, each tooth or step, while being inclined at an angle relative to the contact face 226, is also a different distance from the proximal end 222. Thus, engagement of the edge 152 with each next step in the sequence as the proximal end 222 is approached actually draws the first component 110 closer to the second component 210 (for tighter engagement between the first and second components 110 and 210) while at the same time making it more difficult to release the engagement between the cantilever snap 100 and the retention device 200 since the edge 152 would have even more steps to clear in order to allow disengagement. In fact, in some situations, it may prove to be impractical or impossible to disengage the cantilever snap 100 and the retention device 200 after engagement without damaging or destroying them.

It will be appreciated that, in some embodiments, the teeth 242 of the holding assembly 240 may allow the first component 110 and second component 210 to fit tightly together despite deviations in the snap portions and/or in the components arising out of the manufacturing process. In other words, embodiments of the invention may allow for greater tolerances. For example, the snap could be designed so that the cantilevered-slant protrusion 130 engages the tooth or step 242 near the middle of the holding assembly 240 (i.e., approximately halfway between the point of maximum thickness 250 and the point where the holding assembly 240 meets the contact face 226). Designed as such, if manufacturing of the components results in the retention body 220 not being able to be inserted through the orifice 120 as much as designed, then the cantilevered-slant protrusion 130 engages a tooth 242 closer to the point of maximum thickness 250, but the first component 110 and second component 210 are still held tightly together. Likewise, if manufacturing of the components results in the retention body 220 being able to be inserted through the orifice 120 more than designed, then the cantilevered-slant protrusion 130 engages a tooth 242 further from the point of maximum thickness 250, but the first component 110 and second component 210 are still held tightly together. Therefore, in some embodiments, the number of teeth 242 and/or the length of the holding assembly 240 can dictate certain tolerances.

FIG. 3 illustrates the engagement between the cantilever snap 100 and the retention device 200 responsive to insertion of the retention device 200 into the cantilever snap 100. As can be seen in FIG. 3, the retention body 220 of the retention device 200 is inserted into the orifice 120 of the cantilever snap 100. The orifice 120 includes sidewalls 122 and the cantilevered-slant protrusion 130 that extends between the sidewalls 122 and out of the orifice 120 at an angle relative to the surface of the first component 110 of which the cantilever snap 100 is an integral portion. The cantilevered-slant protrusion 130 faces the alignment rib 140 to define the space (e.g., the receiving area 150 of FIG. 1) into which the retention body 220 is placed. The alignment rib 140 faces the cantilevered-slant protrusion 130 to pinch the retention body 220 therebetween. The retention body 220 is inserted from a side opposite of the side of the first component 110 away from which the cantilevered-slant protrusion 130 extends and pulled through the space until a holding assembly 240 that lies in a plane that lies at an angle to the plane in which the retention body 220 lies.

Example embodiments may therefore provide a mechanism by which to attach two components together using snap fittings that are integrally formed with the respective components. Moreover, some example embodiments may provide the cantilever portion (e.g., the cantilevered-slant protrusion 130) and an undercut (e.g., the retaining extension 230) on separate components, contrary to the design of many common cantilever snaps. Example embodiments may be used, for example, to join adjacent components or parts during the assembly of various types of devices including, as an example, outdoor power equipment such as lawn mowers. The joint formed may have a low insertion force requirement, but may provide for a very high removal force. In this regard, when one tries to pull the assembly apart, the force may be funneled down the length of the retention body to create a moment on the top of the snap that would only tighten the fit. Furthermore, the step-like construction may provide an audible snap sound as each step is encountered so that assemblers may be able to audibly discern that the snap has been engaged. Moreover, there are multiple possible levels of engagement (e.g., corresponding to each step that can be sequentially engaged), so there is some flexibility in the spacing that can be provided between the components while still providing a secure fit. Each of the multiples levels of engagement may correspond to respective ones of a series of step-like protrusions that each defines a discrete holding point at which the retention body 220 may be held. Each discrete holding point may be a corresponding different distance from a distal end 224 of the retention body 220.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A snap assembly comprising:
a cantilever snap including an orifice defined in a surface of a first component, the orifice being defined between sidewalls, the cantilever snap further comprising a cantilevered-slant protrusion extending between the sidewalls and out of the orifice at an acute angle relative to the surface of the first component and being unsupported at portions of the cantilevered-slant protrusion that correspond to the sidewalls; and
a retention body attached to a second component and configured to be inserted into the orifice from a side of the first component that is opposite of a side of the first component away from which the cantilevered-slant protrusion extends to secure the retention body to the cantilever snap, the retention body including a retaining extension comprising a holding assembly that lies in a plane that lies at an angle to a plane in which the retention body lies,
wherein the retaining extension further comprises a lead-in extending away from a surface of the retention body,
wherein the cantilever snap further comprises an alignment rib that faces an engagement face of the cantilevered-slant protrusion to pinch the retention body therebetween;
wherein the alignment rib defines an engagement surface that lies in a plane that is substantially parallel to a plane in which the engagement face of the cantilevered-slant protrusion lies, and
wherein the retention body extends away from a surface of the second component such that, responsive to insertion of the retention body into the orifice past the lead-in, the surface of the second component and the surface of the first component are held parallel to each other, and the retention body forms a second acute angle with both the surface of the first component and the surface of the second component.

2. The snap assembly of claim 1, wherein the lead-in forms a slanted surface relative to a contact face of the retention body, the contact face contacting the cantilevered-slant protrusion responsive to insertion of the retention body into the orifice, the lead-in slidably contacting the cantilevered-slant protrusion responsive to insertion of the retention body into the orifice.

3. The snap assembly of claim 2, wherein the lead-in is disposed proximate to the holding assembly, the lead-in being closer to a distal end of the retention body than the holding assembly.

4. The snap assembly of claim 2, wherein a thickness of the retention body increases linearly over a length of the lead-in.

5. The snap assembly of claim 4, wherein a point of maximum thickness of the retention body separates the lead-in from the holding assembly.

6. The snap assembly of claim 1, wherein the holding assembly comprises a plurality of teeth.

7. The snap assembly of claim 6, wherein each tooth of the plurality of teeth includes a first portion that lies in a plane substantially perpendicular to a plane in which the retention body lies and a second portion that lies in a plane substantially parallel to the plane in which the retention body lies.

8. The snap assembly of claim 6, wherein the plurality of teeth are arrayed to form a series of step protrusions that sequentially step away from a contact face of the retention body.

9. The snap assembly of claim 8, wherein each of the series of step protrusions defines a discrete holding point at which the retention body may be held, each discrete holding point being a corresponding different distance from a distal end of the retention body.

10. The snap assembly of claim 8, wherein the cantilevered-slant protrusion comprises an edge portion that engages a respective one of the step protrusions to prevent movement of the retention body in a direction opposite a direction of insertion of the retention body into the orifice.

11. The snap assembly of claim 1, wherein the cantilevered-slant protrusion comprises an edge portion disposed proximate to the engagement face to engage the holding assembly to prevent movement of the retention body in a direction opposite a direction of insertion of the retention body into the orifice.

12. The snap assembly of claim 1, wherein the first component and the second component are components of outdoor power equipment.

13. The snap assembly of claim 1, wherein the first component and the second component are components of a lawn mower.

14. The snap assembly of claim 1, wherein the first component and the second component are fixed to each other by insertion of the retention body into the orifice at least to a point at which the holding assembly contacts the cantilevered-slant protrusion.

15. The snap assembly of claim 1, wherein the acute angle is less than a 45 degree angle.

16. The snap assembly of claim 1, wherein a point of maximum thickness separates the holding assembly and the lead-in.

17. The snap assembly of claim 1, wherein a distal end of the cantilevered-slant protrusion forms a sharp edge.

18. The snap assembly of claim 1, wherein a width of the retention body remains constant over an entirety of a length of the retention body.

19. The snap assembly of claim 1, wherein a thickness of the retention body remains constant over an entirety of a length of the retention body.

20. The snap assembly of claim 1, wherein the engagement face and the engagement surface face each other, and wherein a reception area is defined between the engagement face and the engagement surface, the reception area being configured to receive the retention body.

* * * * *